(12) United States Patent
Chamberlain et al.

(10) Patent No.: US 11,952,511 B2
(45) Date of Patent: Apr. 9, 2024

(54) AQUEOUS COATING COMPOSITIONS INCLUDING XANTHAN GUM-BASED RHEOLOGY PACKAGE

(71) Applicant: SWIMC LLC, Cleveland, OH (US)

(72) Inventors: Randy Chamberlain, Cleveland, OH (US); Rachael Ilic, Cleveland, OH (US); Isaac Quinones, Cleveland, OH (US); Zhiwei Xie, Cleveland, OH (US)

(73) Assignee: SWIMC LLC, Cleveland, OH (US)

( * ) Notice: Subject to any disclaimer, the term of this patent is extended or adjusted under 35 U.S.C. 154(b) by 577 days.

(21) Appl. No.: 16/818,704

(22) Filed: Mar. 13, 2020

(65) Prior Publication Data

US 2020/0291249 A1    Sep. 17, 2020

Related U.S. Application Data

(60) Provisional application No. 62/819,234, filed on Mar. 15, 2019.

(51) Int. Cl.
| | |
|---|---|
| *C09D 7/65* | (2018.01) |
| *C09D 7/45* | (2018.01) |
| *C09D 7/47* | (2018.01) |
| *C09D 133/08* | (2006.01) |
| *C09D 133/10* | (2006.01) |

(52) U.S. Cl.
CPC .............. *C09D 7/65* (2018.01); *C09D 7/45* (2018.01); *C09D 7/47* (2018.01); *C09D 133/08* (2013.01); *C09D 133/10* (2013.01)

(58) Field of Classification Search
CPC ....................................................... C09D 7/45
See application file for complete search history.

(56) References Cited

U.S. PATENT DOCUMENTS

| | | | |
|---|---|---|---|
| 4,155,887 A | 5/1979 | Hetson | |
| 5,164,433 A | 11/1992 | Ricci et al. | |
| 5,368,843 A | 11/1994 | Rennie | |
| 5,521,234 A | 5/1996 | Brown et al. | |
| 5,879,940 A | 3/1999 | Torok-Storb et al. | |
| 6,479,573 B2 | 11/2002 | Burdick et al. | |
| 6,762,230 B2 | 7/2004 | Brandenburger et al. | |
| 7,629,399 B2 | 12/2009 | Bloom et al. | |
| 7,776,103 B2 | 8/2010 | Wahle et al. | |
| 7,776,108 B2 | 8/2010 | Shah et al. | |
| 8,034,869 B2 | 10/2011 | Bobsein et al. | |
| 8,450,386 B2 | 5/2013 | Melbouci | |
| 8,491,969 B2 | 7/2013 | Willimann et al. | |
| 9,156,975 B2 | 10/2015 | Auld et al. | |
| 9,290,669 B2 * | 3/2016 | Dunford | C09D 5/14 |
| 2007/0154664 A1 | 7/2007 | Johnson | |
| 2007/0298965 A1 * | 12/2007 | Schneider | A01N 37/52 |
| | | | 514/772.3 |
| 2008/0227892 A1 | 9/2008 | van der Wielen et al. | |
| 2010/0069536 A1 * | 3/2010 | Sau | C08G 65/337 |
| | | | 524/451 |
| 2012/0082791 A1 | 4/2012 | Liversage | |
| 2015/0197656 A1 | 7/2015 | Hohmann | |
| 2017/0127603 A1 * | 5/2017 | Reus | A01C 1/06 |
| 2018/0223110 A1 * | 8/2018 | Mesa | C09D 5/008 |

FOREIGN PATENT DOCUMENTS

| | | |
|---|---|---|
| CN | 1280600 A | 1/2001 |
| CN | 101704914 | 5/2010 |
| EP | 1044244 | 10/2000 |
| EP | 1059338 | 12/2000 |
| EP | 1568740 | 8/2005 |
| JP | 07187983 A * | 7/1995 |
| WO | 2011071876 A1 | 6/2011 |
| WO | 2011150224 A1 | 12/2011 |
| WO | 2014044616 A1 | 3/2014 |

OTHER PUBLICATIONS

Machine translation of JP 07-187983 A, published Jul. 25, 1995.*
Response to Communication Pursuant to Rules 161(1) and 162 EPC dated Oct. 10, 2021, from counterpart European Application No. 20718891.3, filed Apr. 26, 2022, 9 pp.
Koleske et al., "Additives Guide," Paint & Coatings Industry, Apr. 2003, 58 pp.
Moorehouse et al., "Xanthan Gum—Molecular Conformation and Interactions," Extracellular Microbial Chapter 7, ACS Symposium Series; American Chemical Society, retrieved on Nov. 30, 2020, 13 pp.
BASF The Chemical Company, "Little helpers love great achievements" E02-0213, retrieved from www.basf.com/formulation-additives on or about Jan. 26, 2018, 15 pp.
Jugbuzlauer, "Xanthan Gum—a bio-based hydrocolloid for paints," accessed from www.jngbunzlauer.com on or about Jan. 26, 2018, 8 pp.
International Search Report and Written Opinion of International Application No. PCT/US2020/022754, dated Jul. 13, 2013 pp.
Sempeho et al., "Encapsulated Urea-Kaolinite Nanocomposite for Controlled Release Fertilizer Formulations," Hindawi Journal of Chemistry, vol. 2015, accepted May 20, 2015, 18 pp.
The DOW Chemical Company, "ACRYSOL™ RM-8W Rheology Modifier," Dec. 2007, 4 pp.
Ashland., "Aquaflow™ NHS-310 nonionic synthetic associative thickener," Product Data No. 4216-3, REV May 2013, 2 pp.
TIC Gums., "Pre-Hydrated® Ticaxan® Rapid-3 Powder," XANT PH-RAPID-3, Mar. 26, 2014, 1 pp.
International Preliminary Report on Patentability from International Application No. PCT/US2020/022754, dated Sep. 30, 2021, 8 pp.
Gwebu, S. et al., "The Effect of Hydroxyl Ethyl Cellulose (HEC) and Hydrophobically—Modified Alkali Soluble Emulsions (HASE) on the properties and quality of water based paints", Int. Journal of Applied Chem., vol. 13, No. 1, 2017, pp. 1-13.

* cited by examiner

*Primary Examiner* — Vickey Nerangis
(74) *Attorney, Agent, or Firm* — Honigman LLP

(57) ABSTRACT

An aqueous coating composition may include an aqueous carrier liquid; xanthan gum in an amount between about 0.05 wt. % and 0.5 wt. % of the aqueous coating composition; and a secondary rheology agent comprising at least one of a waterborne clay, a hydrophobically modified alkaline swellable emulsion, a hydrophobically enhanced urethane, a polyether polyol, or a hydrophobically modified ethoxylated aminoplast.

15 Claims, 10 Drawing Sheets

AQUEOUS COATING COMPOSITIONS INCLUDING XANTHAN GUM-BASED RHEOLOGY PACKAGE

CROSS REFERENCE TO RELATED APPLICATIONS

This application claims the benefit of U.S. Provisional Application No. 62/819,234, filed Mar. 15, 2019. The entire contents of which are incorporated herein by reference.

BACKGROUND

Water-based coating compositions balance many competing considerations relating to coating application, drying time, and final appearance. For example, it may be desired for an aqueous coating composition to provide relatively good flowability to facilitate coating application and smooth surface finish while also providing good sag resistance and thick film build to reduce runs and the required number of coating applications. Rheology packages may enable achieving a better balance of aqueous coating composition properties.

SUMMARY

In some examples, the disclosure describes an aqueous coating composition that includes an aqueous carrier liquid; xanthan gum in an amount between about 0.05 wt. % and 0.5 wt. % of the aqueous coating composition; and a secondary rheology agent comprising at least one of a waterborne clay, a hydrophobically modified alkaline swellable emulsion, a hydrophobically enhanced urethane, a polyether polyol, or a hydrophobically modified ethoxylated aminoplast.

In some examples, the disclosure describes an aqueous coating composition that includes an aqueous carrier liquid; a polymeric binder; and a rheology package including xanthan gum; and a secondary rheology agent comprising at least one of a waterborne clay, a hydrophobically modified alkaline swellable emulsion, a hydrophobically enhanced urethane, a polyether polyol, or a hydrophobically modified ethoxylated aminoplast, wherein the xanthan gum is present in an amount between about 0.05 wt. % and 0.5 wt. % of the aqueous coating composition.

In some examples, the disclosure describes an article including a substrate; and a coating system on the substrate. The coating system includes at least one layer formed from an aqueous coating composition that includes an aqueous carrier liquid; a polymeric binder; and a rheology package including xanthan gum; and a secondary rheology agent comprising at least one of a waterborne clay, a hydrophobically modified alkaline swellable emulsion, a hydrophobically enhanced urethane, a polyether polyol, or a hydrophobically modified ethoxylated aminoplast, wherein the xanthan gum is present in an amount between about 0.05 wt. % and 0.5 wt. % of the aqueous coating composition.

In some examples, the disclosure describes a method including coating a substrate with a coating formed from an aqueous coating composition that includes an aqueous carrier liquid; a polymeric binder; and a rheology package including xanthan gum; and a secondary rheology agent comprising at least one of a waterborne clay, a hydrophobically modified alkaline swellable emulsion, a hydrophobically enhanced urethane, a polyether polyol, or a hydrophobically modified ethoxylated aminoplast, wherein the xanthan gum is present in an amount between about 0.05 wt. % and 0.5 wt. % of the aqueous coating composition.

The details of one or more examples are set forth in the accompanying drawings and the description below. Other features, objects, and advantages of the disclosure will be apparent from the description and drawings, and from the claims.

DETAILED DESCRIPTION

Figure 1:
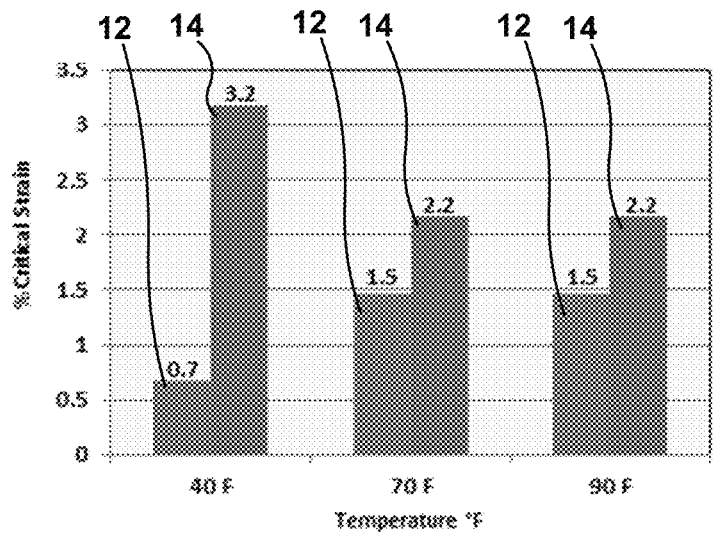
FIG. 1 is a plot of critical strain percent as a function of temperature for an example aqueous coating composition in accordance with this disclosure and a comparative aqueous coating composition that does not include xanthan gum.

A "latex" polymer means a dispersion or emulsion of polymer particles formed in the presence of water and one or more dispersing or emulsifying agents (e.g., a surfactant, alkali-soluble polymer, or mixtures thereof) whose presence is required to form the dispersion or emulsion. The dispersing or emulsifying agent is typically separate from the polymer after polymer formation. In some examples, a reactive dispersing or emulsifying agent may become part of the polymer particles as they are formed.

The recitation of a numerical range using endpoints includes all numbers subsumed within that range (e.g., 1 to 5 includes 1, 1.5, 2, 2.75, 3, 3.80, 4, 5, etc.).

The terms "a," "an," "the," "at least one," and "one or more" are used interchangeably. Thus, for example, an aqueous coating composition that contains "an" additive means that the aqueous coating composition includes "one or more" additives.

The phrase "low VOC" when used with respect to a liquid coating composition means that the liquid coating composition contains less than about 150 grams VOC per L composition, excluding water weight (g VOC/L composition; about 15% w/v), preferably not more than about 100 g VOC/L composition (about 10% w/v), more preferably not more than about 50 g VOC/L composition (about 5% w/v), and most preferably less than 20 g VOC/L composition (about 2% w/v), for example not more than about 10 g VOC/L composition (about 1% w/v) or not more than about 8 g VOC/L composition (about 0.8% w/v) volatile organic compounds.

The term "(meth)acrylic acid" includes either or both of acrylic acid and methacrylic acid, and the term "(meth)acrylate" includes either or both of an acrylate and a methacrylate.

The terms "topcoat" or "final topcoat" refer to an aqueous coating composition which when dried or otherwise hardened provides a decorative or protective outermost finish layer on a substrate, for example, a polymeric membrane attached to a building exterior (e.g., a roof). By way of further explanation, such final topcoats include paints, stains or sealers capable of withstanding extended outdoor exposure (e.g., exposure equivalent to one year of vertical south-facing Florida sunlight) without visually objectionable deterioration, but do not include primers that would not withstand extended outdoor exposure if left uncoated with a topcoat.

The present disclosure describes aqueous coating compositions that include a rheology package including xanthan gum and a secondary rheology agent. Xanthan gum may function as both a rheology agent and a humectant in the aqueous coating composition. Xanthan gum may contribute to the aqueous coating composition having more consistent viscosity as a function of temperature and improved application and appearance as a function of temperature and humidity due to xanthan gum's rheologic properties. The secondary rheology agent facilitates use of xanthan gum as a rheology agent by raising a loss tangent (tan delta) after shear of the aqueous coating composition, which improves flow and levelling behavior of an applied aqueous coating composition. The combination of xanthan gum and the secondary rheology agent results in the aqueous coating composition having more consistent viscosity, application properties, and appearance as a function of temperature and humidity due to the presence of xanthan gum, along with suitable flow and levelling behavior due to the inclusion of the secondary rheology agent.

Aqueous coating compositions applied in architectural applications, such as latex-based paints and stains, may be applied in a wide range of conditions. The conditions may range from just above freezing (e.g., about 35° F.) to 110° F. or more, even in the course of a single day. Further, humidity may vary greatly, e.g., from the dry southwest United States to the humid south-east coast. Temperature and humidity affect many properties of aqueous coating compositions, including, for example, open time, workability, wet edge, flow and levelling, gun spits, spray tip clogging, atomization, and coverage.

Thickeners or rheology agents are used in aqueous coating compositions to provide desirable application properties. However, some thickeners or rheology agents have properties that vary significantly as a function of temperature. For example, hydroxyethyl cellulose (HEC) thickeners or rheology agents may have a viscosity that varies as a function of temperature to an undesirable amount.

In contrast, xanthan gum provides increased consistency in low shear and/or mid shear viscosity of an aqueous coating composition as a function of temperature between about 35° F. (about 2° C.) and about 100° F. (about 37.7° C.) compared to aqueous coating compositions including other rheology agents such as HEC. Xanthan gum also provides more consistent rheological properties over a range of temperatures than other hydrocolloids, such as alginates, guar gum, cellulose derivatives, or the like. Additionally, or alternatively, since xanthan gum is a humectant, xanthan gum contributes to the aqueous coating composition having increased open time, which refers to a time for which the aqueous coating composition can be exposed to air before skinning, syneresis, or drying, compared to aqueous coating compositions that do not include xanthan gum.

While not wishing to be bound by theory, xanthan gum molecules form a substantially rigid, right-handed, five-fold helix. Large, overlapping side chains surround the backbone, which reduces or substantially prevents changes in hydrodynamic volume as a function of temperature. It is currently believed that this structural conformation contributes to the relative consistency in viscosity and humectant properties of xanthan gum as a function of temperature and humidity.

In some examples, the xanthan gum may be a pre-hydrated, agglomerated, food grade xanthan gum powder. For example, the xanthan gum may include Pre-Hydrated® Ticaxan® Rapid-3 Powder, available from TIC Gums, White Marsh, Maryland. Food grade xanthan gum is pre-hydrated, which may reduce clumping upon mixing into the aqueous coating composition. Other xanthan gums, such as industrial grade xanthan gums, may not be pre-hydrated, and initial contact of the powder with water may result in clumping due to the highly hydrophilic nature of xanthan gum. Such clumping makes mixing more difficult and reduces appearance qualities of the aqueous coating composition. In contrast, pre-hydrated food grade xanthan gum are relatively easy to disperse when formulating the aqueous coating composition compared to industrial grades of xanthan gum, which reduces clumping and facilitates mixing Aqueous coating compositions that include xanthan gum as part of a rheology package exhibit a reduced flow point compared to some other aqueous coating compositions at both relatively high temperatures (e.g., about 100° F.) and relatively low temperatures (e.g., about 35° F.). This facilitates spray atomization, reduces spray gun noise, and eases brush transfer and release compares to aqueous coating compositions with higher flow points.

Similarly, aqueous coating compositions that include xanthan gum as part of a rheology package exhibit more consistent loss tangent (tan delta) after shear than some other aqueous coating compositions at both relatively high temperatures (e.g., about 100° F.) and relatively low temperatures (e.g., about 35° F.). This indicates that aqueous coating compositions that include xanthan gum may exhibit better flow and levelling, reduced brush lines, or the like than a coating with less consistent loss tangent after shear, particular aqueous coating compositions that exhibit a lower loss tangent (tan delta) after shear than before shear. Thus, xanthan gum contributes to improved appearance of coatings formed using aqueous coating compositions that includes xanthan gum as part of a rheology package.

In some examples, the aqueous coating composition may include at least about 0.05 wt. % xanthan gum based on the total weight of the aqueous coating composition, at least about 0.1 wt. % xanthan gum based on the total weight of the aqueous coating composition, or at least about 0.2 wt. % xanthan gum based on the total weight of the aqueous coating composition. The aqueous coating composition also may include less than about 0.5 wt. % xanthan gum based on the total weight of the aqueous coating composition, less than about 0.45 wt. % xanthan gum based on the total weight of the aqueous coating composition, less than about 0.4 wt. % xanthan gum based on the total weight of the aqueous coating composition, or less than about 0.35 wt. % xanthan gum based on the total weight of the aqueous coating composition.

The rheology package also includes a secondary rheology agent. The secondary rheology agent contributes to mid shear and high shear properties of the aqueous coating composition. The secondary rheology agent facilitates use of xanthan gum as a rheology agent by increasing a loss tangent (tan delta) after shear of the aqueous coating composition, which improves flow and levelling behavior of an applied aqueous coating composition. The combination of xanthan gum and the secondary rheology agent results in the aqueous coating composition having more consistent viscosity, application properties, and appearance as a function of temperature and humidity due to the presence of xanthan gum, along with suitable flow and levelling behavior due to the inclusion of the secondary rheology agent.

For example, the secondary rheology agent may include at least one of a waterborne clay; a hydrophobically modified alkali-swellable emulsion (HASE); or an associative thickener such as a hydrophobically enhanced urethane (HEUR), a polyether polyol (PEPO), or a hydrophobically modified ethoxylated aminoplast thickener (HEAT). In some examples, the HEUR thickener may be a hydrophibically enhanced modified ethylene oxide urethane. The rheology package may be substantially free (e.g., free or nearly free) of cellulose-derived rheology agents, such as a hydroxyethylcellulose (HEC) thickener. HEC in combination with xanthan gum may reduce a loss tangent (tan delta) after shear of the aqueous coating composition, negatively affecting flow and levelling behavior of an applied aqueous coating composition.

Waterborne clays include, for example, a magnesium aluminum phyllosilicate such as attapulgite $((Mg,Al)_2 Si_4O_{10}(OH)\cdot 4(H_2O))$, hectorite $(Na_{0.3}(Mg,Li)_3Si_4O_{10}(OH)_2)$, an organically modified hectorite, a synthetic hectorite, or the like. Examples are available under the trade designations MIN-U-GEL® 400 from Active Minerals International, LLC, Sparks, Maryland; and ATTAGEL® 40 and ATTAGEL® 50 from BASF SE, Ludwigshafen, Germany.

Example HASE rheology agents include those available under the trade designations ACRYSOL™ TT-935 from Dow Chemical Company, Midland, Michigan; POLYPHOBE® TR-116 from Arkema Inc., King of Prussia, Pennsylvania; RHEOTECH™ 3800 from Arkema Inc., King of Prussia, Pennsylvania; POLYPHOBE™ PP 102 from Arkema Inc., King of Prussia, Pennsylvania; RHEOLATE® 1 from Elementis Specialties, Inc., East Windsor, New Jersey; ACRYSOL™ ASE-60 from Dow Chemical Company, Midland, Michigan; ACRYSOL™ TT-615, from Dow Chemical Company, Midland, Michigan; ACRYSOL™ DR-300, from Dow Chemical Company, Midland, Michigan; POLYPHOBE® TR-117 from Arkema Inc., King of Prussia, Pennsylvania; and ACRYSOL™ RM-5 from Dow Chemical Company, Midland, Michigan.

Example associative thickeners include those available under the trade designations ACRYSOL™ RM-2020 NPR from Dow Chemical Company, Midland, Michigan; ACRYSOL™ SCT-275 from Dow Chemical Company, Midland, Michigan; ACRYSOL™ RM-825 from Dow Chemical Company, Midland, Michigan; ACRYSOL™ RM-8W from Dow Chemical Company, Midland, Michigan; ACRYSOL™ RM-12W from Dow Chemical Company, Midland, Michigan; RHEOLATE® 350 from Elementis Specialties, Inc., East Windsor, New Jersey; AQUAFLOW™ NHS-310 from Ashland, Inc., Covington, Kentucky; AQUAFLOW™ NHS-350 from Ashland, Inc., Covington, Kentucky; OPTIFLO® L100 from Byk GmbH, Wesel, Germany; OPTIFLO® H3300 VF from Byk GmbH, Wesel, Germany; and OPTIFLO® H370 from Byk GmbH, Wesel, Germany.

In some examples, the secondary rheology agent may include two or more waterborne clays; two or more HASE thickeners; two or more HEUR thickeners, two or more PEPO thickeners, two or more HEAT thickeners, or combinations of two or more HASE, HEUR, PEPO, or HEAT thickeners. For example, the secondary rheology agent may include a HEUR thickener and a PEPO thickener.

The aqueous coating composition may include at least about 0.1 wt. % of the secondary rheology agent based on the total weight of the aqueous coating composition, at least about 0.2 wt. % of the secondary rheology agent based on the total weight of the aqueous coating composition, at least about 0.3 wt. % of the secondary rheology agent based on the total weight of the aqueous coating composition, or at least about 0.5 wt. % of the secondary rheology agent based on the total weight of the aqueous coating composition. The aqueous coating composition may include less than about 2.75 wt. % of the secondary rheology agent based on the total weight of the aqueous coating composition, less than about 2.5 wt. % of the secondary rheology agent based on the total weight of the aqueous coating composition, less than about 2 wt. % of the secondary rheology agent based on the total weight of the aqueous coating composition, or less than about 1.5 wt. % of the secondary rheology agent based on the total weight of the aqueous coating composition. In examples in which the rheology package includes two secondary rheology agents, the aqueous coating composition may include between about 0.2 wt. % and about 2.5 wt. % of a first secondary rheology agent (e.g., a PEPO thickener) based on the total weight of the aqueous coating composition and between about 0.1 wt. % and about 1 wt. % of a second secondary rheology agent (e.g., a HEUR thickener) based on the total weight of the aqueous coating composition. In some examples, the aqueous coating composition may include between about 0.2 wt. % and about 2.5 wt. % of a first secondary rheology agent (e.g., a PEPO thickener) based on the total weight of the aqueous coating composition and between about 0.1 wt. % and about 0.25 wt. % of a second secondary rheology agent (e.g., a HEUR thickener) based on the total weight of the aqueous coating composition.

The aqueous coating composition may be substantially free (e.g., free or nearly free) of cellulose-derived rheology agents, such as a hydroxyethylcellulose (HEC) thickener. HEC in combination with xanthan gum may reduce a loss tangent (tan delta) after shear of the aqueous coating composition, negatively affecting flow and levelling behavior of an applied aqueous coating composition.

The aqueous coating composition may include a surface-active agent (e.g., surfactant) either as part of the rheology package, as part of the aqueous coating composition, or both. The surface-active agent may modify affect dispersion of the rheology package in the aqueous coating composition, modify the interaction of the coating composition with the substrate or with a prior applied coating, or both. The surface-active agent affects qualities of the aqueous coating composition including how the aqueous coating composition is handled, how it spreads across the surface of the substrate, and how it bonds to the substrate. The surface-active agent can modify the ability of the aqueous coating composition to wet a substrate and also may be referred to as a wetting agent. Surface-active agents may also provide leveling, defoaming, or flow control properties, and the like. If the aqueous coating composition includes a surface-active agent, the surface-active agent is preferably present in an amount of less than 5 wt. %, based on the total weight of the aqueous coating composition. Surface-active agents suitable for use in the coating composition will be known to persons having ordinary skill in the art or can be determined using standard methods. Some suitable surface-active agents include those available under the trade designations STRODEX™ KK-95H, STRODEX™ PLF100, STRODEX™ PKOVOC, STRODEX™ LFK70, STRODEX™ SEK50D and DEXTROL™ OC50 from Dexter Chemical L.L.C., Bronx, New York; HYDROPALAT™ 100, HYDROPALAT™ 140, HYDROPALAT™ 44, HYDROPALAT™ 5040 and HYDROPALAT™ 3204 from Cognis Corporation, Cincinnati, Ohio; LIPOLIN™ A, DISPERS™ 660 C, DISPERS™ 715 W and DISPERS™ 750 W from Degussa Corporation, Parsippany, New Jersey; BYK™ 156, BYK™ 2001 and ANTI-TERRA™ 207 from Byk Chemie, Wallingford, Connecticut; DISPEX™ A40, DISPEX™ N40, DISPEX™ R50, DISPEX™ G40, DISPEX™ GA40, EFKA™ 1500, EFKA™ 1501, EFKA™ 1502, EFKA™ 1503, EFKA™ 3034, EFKA™ 3522, EFKA™ 3580, EFKA™ 3772, EFKA™ 4500, EFKA™ 4510, EFKA™ 4520, EFKA™ 4530, EFKA™ 4540, EFKA™ 4550, EFKA™ 4560, EFKA™ 4570, EFKA™ 6220, EFKA™ 6225, EFKA™ 6230 and EFKA™ 6525 from Ciba Specialty Chemicals, Tarrytown, New York; SURFYNOL™ CT-111, SURFYNOL™ CT-121, SURFYNOL™ CT-131, SURFYNOL™ CT-211, SURFYNOL™ CT 231, SURFYNOL™ CT-136, SURFYNOL™ CT-151, SURFYNOL™ CT-171, SURFYNOL™ CT-234, CARBOWET™ DC-01, SURFYNOL™ 104, SURFYNOL™ PSA-336, SURFYNOL™ 420, SURFYNOL™ 440, ENVIROGEM™ AD-01 and ENVIROGEM AE01 from Air Products & Chemicals, Inc., Allentown, Pennsylvania; TAMOL™ 1124, TAMOL 850, TAMOL 681, TAMOL™ 731 and TAMOL™ SG-1 from Rohm and Haas Co., Philadelphia, Pennsylvania; IGEPAL™ CO-210, IGEPAL™ CO-430, IGEPAL™ CO-630, IGEPAL™ CO-730, and IGEPAL™ CO-890 from Rhodia Inc., Cranbury, New Jersey; T-DET™ and T-MULZ™ products from Harcros Chemicals Inc., Kansas City, Kansas; polydimethylsiloxane surface-active agents (such as those available under the trade designations SILWET™ L-760 and SILWET™ L-7622 from OSI Specialties, South Charleston, West Virginia, or BYK™ 306 from Byk-Chemie) and fluorinated surface-active agents (such as that commercially available as FLUORAD™ FC-430 from 3M Co., St. Paul, Minnesota).

In some examples, the surface-active agent may be a defoamer. The aqueous coating composition may include a single surface-active agent, or multiple surface-active agents, e.g., a first surface-active agent and a second defoamer. Some suitable defoamers include those sold under the trade names BYK™ 018, BYK™ 019, BYK™ 020, BYK™ 022, BYK™ 025, BYK™ 032, BYK™ 033, BYK™ 034, BYK™ 038, BYK™ 040, BYK™ 051, BYK™ 060, BYK™ 070, BYK™ 077 and BYK™ 500 from Byk Chemie; SURFYNOL™ DF-695, SURFYNOL™ DF-75, SURFYNOL™ DF-62, SURFYNOL™ DF-40 and SURFYNOL™ DF-110D from Air Products & Chemicals, Inc.; DEEFO™ 3010A, DEEFO™ 2020 E/50, DEEFO™ 215, DEEFO™ 806-102 and AGITAN™ 31 BP from Munzing Chemie GmbH, Heilbronn, Germany; EFKA 2526, EFKA 2527 and EFKA 2550 from Ciba Specialty Chemicals; FOAMAX™ 8050, FOAMAX™ 1488, FOAMAX™ 7447, FOAMAX™ 800, FOAMAX™ 1495 and FOAMAX 810 from Degussa Corp.; FOAMASTER™ 714, FOAMASTER™ A410, FOAMASTER™ 111, FOAMASTER™ 333, FOAMASTER™ 306, FOAMASTER™ SA-3, FOAMASTER™ AP, DEHYDRAN™ 1620, DEHYDRAN™ 1923 and DEHYDRAN™ 671 from Cognis Corp.

The aqueous coating composition additionally may include a polymeric binder. The polymeric binder may include any suitable polymeric binder. The polymeric binder may include, for example, a polymeric binder used in a paint formulation, a clear-coat formulation, a stain formulation, a sealant formulation, or the like, and may be used in a water-based formulation or a solvent-free formulation. The polymeric binder may be present in a carrier liquid in some examples and may be dispersed in the carrier liquid (e.g., in an emulsion stabilized colloidally or using a surfactant), present as a solute in the carrier liquid (e.g., in a solution polymer), or the like.

In some examples, the polymer binder may be based on polyurethane chemistry, latex chemistry, (meth)acrylate chemistry, acetate chemistry (e.g., ethylene-vinyl acetate), or the like. The polymer binder may be synthetic or may be a naturally occurring polymer, biological polymer, or a bio-based polymer, such as a polysaccharide, a polypeptide, a lipid, a nucleic acid-based polymer, either crosslinked or uncrosslinked. Some example polymer binders include poly (ethylene-vinyl acetate) "PEVA," a vinyl ester homopolymer or copolymer, a silane or fluorine containing latex emulsion, or the like. For example, the polymeric binder may include a latex-based paint formulation and may include a polymeric binder including a latex copolymer that is surfactant or colloidally stabilized in the latex emulsion.

The latex copolymer may include a (meth)acrylic latex, a vinyl acrylic latex, or a styrene acrylic latex. The latex copolymer may be formed from reactants including methyl acrylate, ethyl acrylate, propyl acrylate, butyl acrylate, 2-ethylhexyl acrylate, methyl methacrylate, ethyl methacrylate, propyl methacrylate, 2-ethylhexyl methacrylate, hydroxyethyl acrylate, hydroxyethyl methacrylate, hydroxybutyl acrylate, hydroxybutyl methacrylate, glycidyl methacrylate, 4-hydroxybutyl acrylate glycidyl ether, 2-(acetoacetoxy)ethyl methacrylate (AAEM), diacetone acrylamide (DAAM), acrylamide, methacrylamide, methylol (meth)acrylamide, styrene, α-methyl styrene, vinyl toluene, vinyl acetate, vinyl propionate, allyl methacrylate, and mixtures thereof Some preferred monomers include styrene, methyl methacrylate, methacrylic acid, acetoacetoxy ethyl methacrylate, butyl acrylate, butyl methacrylate, and the like.

In some examples, the reactants that form the latex copolymer also include an ethylenically unsaturated polar component. For example, the ethylenically unsaturated polar component may include an ethylenically unsaturated monomer including at least one alcohol group, an ethylenically unsaturated ionic monomer, an at least partially neutralized ethylenically unsaturated ionic monomer, or the like. The at least partially neutralized ethylenically unsaturated ionic monomer may be a salt form of the ethylenically unsaturated ionic monomer, and the salt form may be formed prior to, during, or after reaction of the ethylenically unsaturated ionic monomer with the other monomers in the reactants to form the latex copolymer.

In some examples, the ethylenically unsaturated polar monomer may include an acid- or anhydride-functional ethylenically unsaturated monomer or an at least partially neutralized acid- or anhydride-functional ethylenically unsaturated monomer. For example, the ethylenically unsaturated polar monomer may include acrylic acid, methacrylic acid, crotonic acid, fumaric acid, maleic acid, 2-methyl maleic acid, itaconic acid, 2-methyl itaconic acid, anhydride variants thereof, at least partially neutralized variants thereof, or combinations thereof.

The reactants used to form the latex copolymer may include at least about 0.1 wt. % of the ethylenically unsaturated polar monomer, based on the total weight of all reactants covalently bound in the latex copolymer. In some examples, the reactants include less than about 10 wt. % of the ethylenically unsaturated polar monomer, based on the total weight of ethylenically unsaturated monomers used to make the latex copolymer.

The reactants that form the latex copolymer also may include a chain transfer agent. In some examples, the reactants include at least about 0.1 wt. % of the chain transfer agent, based on the total weight of ethylenically unsaturated monomers used to make the latex copolymer. In some examples, the reactants may include less than about 2 wt. % of the chain transfer agent, based on the total weight of ethylenically unsaturated monomers used to make the latex copolymer. The chain transfer agent may include any suitable chain transfer agent, such as a thiol. In some examples, the chain transfer agent includes or consists of a mercaptan, such as dodecyl mercaptan.

In some examples, the reactants further include a ureido-functional monomer. The ureido-functional monomer may affect adhesion of the latex copolymer to substrates, including polymeric substrates. In some examples, the ureido-functional monomer includes a ureido-functional ethylenically unsaturated monomer, such as a ureido-functional methacrylic monomer.

In some examples, the reactants further include a seed latex. The seed latex may function as a polymerization growth site and may affect a final particle size of the latex copolymer The latex copolymers disclosed above may, in some examples, be formed and/or stabilized with one or more emulsifiers (e.g., surfactants), used either alone or together. Examples of suitable nonionic emulsifiers include tert-octylphenoxyethylpoly(39)-ethoxyethanol, dodecyloxypoly(10)ethoxyethanol, nonylphenoxyethyl-poly(40)ethoxyethanol, polyethylene glycol 2000 monooleate, ethoxylated castor oil, fluorinated alkyl esters and alkoxylates, polyoxyethylene (20) sorbitan monolaurate, sucrose monococoate, di(2-butyl) phenoxypoly(20)ethoxyethanol, hydroxyethylcellulosepolybutyl acrylate graft copolymer, dimethyl silicone polyalkylene oxide graft copolymer, poly(ethylene oxide)poly(butyl acrylate) block copolymer, block copolymers of propylene oxide and ethylene oxide, 2,4,7,9-tetramethyl-5-decyne-4,7-diol ethoxylated with ethylene oxide, N-polyoxyethylene(20)lauramide, N-lauryl-N-polyoxyethylene(3)amine and poly(10)ethylene glycol dodecyl thioether. Examples of suitable anionic emulsifiers include sodium lauryl sulfate, sodium dodecylbenzenesulfonate, potassium stearate, sodium dioctyl sulfosuccinate, sodium dodecyldiphenyloxide disulfonate, nonylphenoxyethylpoly(1)ethoxyethyl sulfate ammonium salt, sodium styrene sulfonate, sodium dodecyl allyl sulfosuccinate, linseed oil fatty acid, sodium, potassium, or ammonium salts of phosphate esters of ethoxylated nonylphenol or tridecyl alcohol, sodium octoxynol-3-sulfonate, sodium cocoyl sarcocinate, sodium 1-alkoxy-2-hydroxypropyl sulfonate, sodium alpha-olefin ($C_{14}$-$C_{16}$)sulfonate, sulfates of hydroxyalkanols, tetrasodium N-(1,2-dicarboxy ethyl)-N-octadecylsulfosuccinamate, disodium N-octadecylsulfosuccinamate, disodium alkylamido poly-ethoxy sulfosuccinate, disodium ethoxylated nonylphenol half ester of sulfosuccinic acid and the sodium salt of tert-octylphenoxyethoxypoly(39)ethoxyethyl sulfate.

The latex copolymers may be polymerized using chain growth polymerization. One or more water-soluble free radical initiators may be used in the chain growth polymerization. Initiators suitable for use in the aqueous coating compositions will be known to persons having ordinary skill in the art or can be determined using standard methods. Representative water-soluble free radical initiators include hydrogen peroxide; tert-butyl peroxide; alkali metal persulfates such as sodium, potassium and lithium persulfate; ammonium persulfate; and mixtures of such initiators with a reducing agent. Representative reducing agents include sulfites such as alkali metal metabisulfite, hydrosulfite, and hyposulfite; sodium formaldehyde sulfoxylate; and reducing sugars such as ascorbic acid and isoascorbic acid. The amount of initiator is preferably from about 0.01 to about 3 wt. %, based on the total weight of ethylenically unsaturated monomers used to make the latex copolymer. In a redox system the amount of reducing agent is preferably from 0.01 to 3 wt. %, based on the total weight of ethylenically unsaturated monomers used to make the latex copolymer. The polymerization reaction can be performed at a temperature in the range of from about 10° C. to about 100° C.

In some examples, the aqueous coating composition may include at least one additive. The at least one additive may include, for example, a dispersant, a biocide, a fungicide, an UV stabilizer, a wetting agent, a filler, a pigment or colorant, or combinations thereof.

The aqueous coating composition may contain one or more optional ingredients that are or contain VOCs. Such ingredients will be known to persons having ordinary skill in the art or can be determined using standard methods. Desirably, the aqueous coating compositions are low VOC, and preferably include not more than 150 g VOC/L composition (about 15% w/v), preferably not more than about 100 g VOC/L composition (about 10% w/v), more preferably not more than about 50 g VOC/L composition (about 5% w/v), and most preferably not more than 20 g VOC/L composition (about 2% w/v), for example not more than about 10 g VOC/L composition (about 1% w/v) or not more than about 8 g VOC/L composition (about 0.8% w/v) volatile organic compounds.

The aqueous coating composition may contain one or more optional coalescents to facilitate film formation. Coalescents suitable for use in the aqueous coating compositions will be known to persons having ordinary skill in the art or can be determined using standard methods. Exemplary coalescents include glycol ethers such those sold under the trade names as EASTMAN' EP, EASTMAN™ DM, EASTMAN' DE, EASTMAN' DP, EASTMAN' DB and EASTMAN' PM from Eastman Chemical Company, Kingsport, Tennessee, and ester alcohols such as those sold under the trade names TEXANOL™ ester alcohol from Eastman Chemical Company. The optional coalescent may be a low VOC coalescent such as is described in U.S. Pat. No. 6,762,230 B2. The aqueous coating compositions may include a low VOC coalescent in an amount of at least about 0.5 wt. %, or at least about 1 part by weight, and or at least about 2 wt. %, based on a total non-volatile weight of the latex copolymer. The aqueous coating compositions also may include a low VOC coalescent in an amount of less than about 10 wt. %, or less than about 6 wt. %, or less than about 4 wt. %, based on a total non-volatile weight of the latex copolymer.

Other optional additives for use in the aqueous coating compositions herein are described in Koleske et al., Paint and Coatings Industry, April, 2003, pages 12-86. Some performance enhancing additives that may optionally be employed include coalescing solvent(s), dispersants, amines, preservatives, biocides, mildewcides, fungicides, glycols, pigments, colorants, dyes, heat stabilizers, leveling agents, anti-cratering agents, curing indicators, plasticizers, fillers, sedimentation inhibitors, ultraviolet-light absorbers, optical brighteners, and the like to modify properties of the aqueous coating composition.

The aqueous coating composition also may contain one or more optional pigments. Pigments suitable for use in the aqueous coating compositions will be known to persons having ordinary skill in the art or can be determined using standard methods. Some suitable pigments include titanium dioxide white, carbon black, lampblack, black iron oxide, red iron oxide, yellow iron oxide, brown iron oxide (a blend of red and yellow oxide with black), phthalocyanine green, phthalocyanine blue, organic reds (such as naphthol red, quinacridone red and toulidine red), quinacridone magenta, quinacridone violet, DNA orange, or organic yellows (such as Hansa yellow). The aqueous coating composition can also include a gloss control additive or an optical brightener, such as that commercially available under the trade designation UVITEX™ OB from Ciba-Geigy.

In some examples, the aqueous coating composition may include an optional filler or inert ingredient. Fillers or inert ingredients extend, lower the cost of, alter the appearance of, or provide desirable characteristics to the aqueous coating composition before and after curing. Fillers and inert ingredients suitable for use in the aqueous coating composition will be known to persons having ordinary skill in the art or can be determined using standard methods. Some suitable fillers or inert ingredients include, for example, clay, glass beads, calcium carbonate, talc, silicas, feldspar, mica, barytes, ceramic microspheres, calcium metasilicates, organic fillers, and the like. Suitable fillers or inert ingredients are preferably present in an aggregate amount of less than 15 wt. %, based on the total weight of the aqueous coating composition.

In certain applications it may also be desirable to include in the aqueous coating composition a biocide, fungicide, or the like. Some suitable biocides or fungicides include those sold under the trade names ROZONE™ 2000, BUSAN™ 1292 and BUSAN 1440 from Buckman Laboratories, Memphis, Tennessee; POLYPHASE™ 663 and POLYPHASE™ 678 from Troy Chemical Corp., Florham Park, New Jersey; and KATHON™ LX from Rohm and Haas Co.

The aqueous coating composition may also include other ingredients that modify properties of the aqueous coating composition as it is stored, handled, or applied, and at other or subsequent stages. Waxes, flatting agents, mar and abrasion additives, and other similar performance enhancing additives may be employed as needed in amounts effective to upgrade the performance of the cured coating and the aqueous coating composition. Some suitable wax emulsions to improve coating physical performance include those sold under the trade names MICHEM™ Emulsions 32535, 21030, 61335, 80939M and 7173MOD from Michelman, Inc. Cincinnati, Ohio and CHEMCOR™ 20N35, 43A40, 950C25 and 10N30 from ChemCor of Chester, New York. Desirable performance characteristics of the coating include adhesion, chemical resistance, abrasion resistance, hardness, gloss, reflectivity, appearance, or combinations of these characteristics, and other similar characteristics. For example, the composition may include abrasion resistance promoting adjuvants such as silica or aluminum oxide (e.g., sol gel processed aluminum oxide).

In certain applications it may also be desirable to include in the aqueous coating composition an optional UV stabilizer. Concentration of the optional UV stabilizer in the aqueous coating composition will be known to persons having ordinary skill in the art or can be determined using standard methods. UV stabilizers may include encapsulated hydroxyphenyl-triazine compositions and other compounds known to persons having ordinary skill in the art, for example, TINUVIN™ 477 DW, commercially available from BASF Corporation.

The aqueous coating composition may be used to coat substrates, e.g., as a primer coat, a topcoat, or a combination primer coat and topcoat. For example, the aqueous coating composition may be used to architectural materials, including brick, concrete, stucco, wood, gypsum board, or the like. As other examples, the aqueous coating composition may be used to coat other materials, such as metals or alloys used in automobiles or other machines, polymeric materials, or the like. Still further, the aqueous coating composition of this invention may be utilized for wood stains and professional wood finishes, both in consumer DIY architectural brush-on applications as well as industrial wood spray-on factory applications such as in professional kitchen cabinetry, furniture and the like.

Clause 1: An aqueous coating composition comprising: an aqueous carrier liquid; xanthan gum in an amount between about 0.05 wt. % and 0.5 wt. % of the aqueous coating composition; and a secondary rheology agent comprising at least one of a waterborne clay, a hydrophobically modified alkaline swellable emulsion, a hydrophobically enhanced urethane, a polyether polyol, or a hydrophobically modified ethoxylated aminoplast.

Clause 2: The aqueous coating composition of clause 1, being essentially free of cellulose and cellulose-derived constituents.

Clause 3: The aqueous coating composition of clause 1 or 2, wherein the secondary rheology agent comprises the hydrophobically enhanced urethane and the polyether polyol.

Clause 4: The aqueous coating composition of clause 3, wherein the hydrophobically enhanced urethane comprises the hydrophobically modified ethylene oxide urethane.

Clause 5: The aqueous coating composition of any one of clauses 1 to 3, wherein the xanthan gum comprises food grade xanthan gum.

Clause 6: The aqueous coating composition of any one of clauses 1 to 5, further comprising a defoamer and a surfactant.

Clause 7: The aqueous coating composition of clause 6, wherein the defoamer comprises a mineral oil.

Clause 8: The aqueous coating composition of clause 6, wherein the defoamer comprises a silicone.

Clause 9: The aqueous coating composition of any one of clauses 6 to 8, wherein the surfactant comprises a phosphate ester.

Clause 10: The aqueous coating composition of any one of clauses 1 to 9, comprising xanthan gum in an amount between about 0.2 wt. % and about 0.4 wt. %.

Clause 11: The aqueous coating composition of any one of clauses 1 to 9, comprising the second rheology agent in an amount between about 0.2 wt. % and about 2.75 wt. %.

Clause 12: The aqueous coating composition of any one of clauses 1 to 9, comprising xanthan gum in an amount between about 0.2 wt. % and about 0.4 wt. %, a hydrophobically enhanced urethane in an amount between about 0.1 wt. % and about 0.25 wt. %, and a polyether polyol in an amount between about 0.2 wt. % and about 2.5 wt. %.

Clause 13: The aqueous coating composition of any one of clauses 1 to 12, wherein the aqueous coating composition exhibits a tan(delta) of less than about 1.5 in a temperature range of about 50° F. to about 100° F. at a shear rate of about 3000/second.

Clause 14: An aqueous coating composition comprising: an aqueous carrier liquid; a polymeric binder; and a rheology package comprising: xanthan gum; and a secondary rheology agent comprising at least one of a waterborne clay, a hydrophobically modified alkaline swellable emulsion, a hydrophobically enhanced urethane, a polyether polyol, or a hydrophobically modified ethoxylated aminoplast, wherein the xanthan gum is present in an amount between about 0.05 wt. % and 0.5 wt. % of the aqueous coating composition.

Clause 15: The aqueous coating composition of clause 14, being essentially free of cellulose and cellulose-derived constituents.

Clause 16: The aqueous coating composition of clause 14 or 15, wherein the secondary rheology agent comprises a hydrophobically enhanced urethane and a polyether polyol.

Clause 17: The aqueous coating composition of clause 16, wherein the hydrophobically enhanced urethane comprises a hydrophobically modified ethylene oxide urethane.

Clause 18: The aqueous coating composition of any one of clauses 14 to 17, wherein the xanthan gum comprises food grade xanthan gum.

Clause 19: The aqueous coating composition of any one of clauses 14 to 18, further comprising a defoamer and a surfactant.

Clause 20: The aqueous coating composition of clause 19, wherein the defoamer comprises a mineral oil.

Clause 21: The aqueous coating composition of clause 19, wherein the defoamer comprises a silicone.

Clause 22: The aqueous coating composition of any one of clauses 19 to 21, wherein the surfactant comprises a phosphate ester.

Clause 23: The aqueous coating composition of any one of clauses 14 to 22, comprising xanthan gum in an amount between about 0.2 wt. % and about 0.4 wt. %.

Clause 24: The aqueous coating composition of any one of clauses 14 to 23, comprising the second rheology agent in an amount between about 0.2 wt. % and about 2.5 wt. %.

Clause 25: The aqueous coating composition of any one of clauses 14 to 24, comprising xanthan gum in an amount between about 0.2 wt. % and about 0.4 wt. %, a hydrophobically enhanced urethane in an amount between about 0.1 wt. % and about 0.25 wt. %, and a polyether polyol in an amount between about 0.2 wt. % and about 2.5 wt. %.

Clause 26: The aqueous coating composition of any one of clauses 14 to 25, wherein the polymeric binder comprises at least one of a (meth)acrylic latex, a vinyl acrylic latex, or a styrene acrylic latex.

Clause 27: The aqueous coating composition of clause 14 to 26, wherein the polymeric binder comprises a polyurethane.

Clause 28: The aqueous coating composition of any one of clauses 14 to 27, further comprising an additive.

Clause 29: The aqueous coating composition of clause 28, wherein the additive comprises at least one of a pigment, a colorant, a dispersant, a fungicide, an UV stabilizer, a wetting agent, a filler, or a coalescent.

Clause 30: The aqueous coating composition of any one of clauses 26 to 29, wherein the at least one of a (meth) acrylic latex, a vinyl acrylic latex, or a styrene acrylic latex is formed from reactants comprising: an ethylenically unsaturated polar monomer; and a chain transfer agent.

Clause 31: The aqueous coating composition of clause 30, wherein the chain transfer agent comprises a mercaptan.

Clause 32: The aqueous coating composition of any one of clauses 26 to 31, wherein the at least one of a (meth) acrylic latex, a vinyl acrylic latex, or a styrene acrylic latex is formed from reactants comprising a ureido-functional monomer.

Clause 33: The aqueous coating composition of any one of clauses 26 to 32, wherein the at least one of a (meth) acrylic latex, a vinyl acrylic latex, or a styrene acrylic latex is formed from reactants comprising a seed latex.

Clause 34: The aqueous coating composition of any one of clauses 14 to 33, comprising less than about 25 g/L volatile organic compounds.

Clause 35: The aqueous coating composition of any one of clauses 14 to 34, wherein the aqueous coating composition exhibits a tan(delta) of less than about 1.5 in a temperature range of about 50° F. to about 100° F. at a shear rate of about 3000/second.

Clause 36: An article comprising: a substrate; and a coating system on the substrate, wherein the coating system includes at least one layer formed from the aqueous coating composition of any one of clauses 14 to 35.

Clause 37: A method comprising: coating a substrate with a coating formed from the aqueous coating composition of any one of clauses 14 to 35.

The disclosure will now be illustrated with reference to the following non-limiting examples.

EXAMPLES

Example 1

FIG. 1 is a plot of critical strain percent as a function of temperature for an example aqueous coating composition in accordance with this disclosure and a comparative aqueous coating composition that does not include xanthan gum. The aqueous coating composition in accordance with this disclosure included the composition shown in the left-hand column of Table 1. The comparative aqueous coating composition included the composition shown in the right-hand column of Table 1.

TABLE 1

| Constituent | Sample 1 (wt. %) | Comparative Sample 1 (wt. %) |
|---|---|---|
| Surfactant | 0.2676 | 0.2634 |
| Plasticizer | 0.7545 | 0.7462 |
| Co-solvent | 0.5333 | 0.5267 |
| Buffer | 0.2042 | 0.2019 |
| Dispersant | 0.4459 | 0.4389 |
| Defoamer | 0.6323 | 0.6251 |
| Biocide | 0.0446 | 0.046 |
| HEC rheology agent | 0 | 0.0878 |
| HEUR rheology agent | 2.3189 | 2.0631 |
| Vinyl acrylic latex | 20.784 | 20.543 |
| Water | 36.521 | 35.847 |
| Extender | 26.649 | 26.337 |
| Attapulgite clay | 0 | 1.3168 |
| Titania | 10.658 | 10.5348 |
| Xanthan gum | 0.1784 | 0 |

The data was collected by performing a 1 Hz amplitude sweep on a Discovery HR-3 hybrid rheometer available from TA Instruments, New Castle, Delaware, at 40° F., 70° F., and 90° F. A 50 mm diameter Peltier plate was used. A logarithmic sweep of strain was performed from 0.1% to 100% strain. As shown in FIG. 1, the example aqueous coating composition in accordance with this disclosure exhibited a higher critical strain at 40° F., 70° F., and 90° F., as shown by bars 14 representing the example aqueous coating composition in accordance with this disclosure compared to bars 12 representing the comparative aqueous coating composition. This indicates that the example aqueous coating composition in accordance with this disclosure is more stable at these temperatures than the comparative aqueous coating composition.

Example 2

Figure 2:
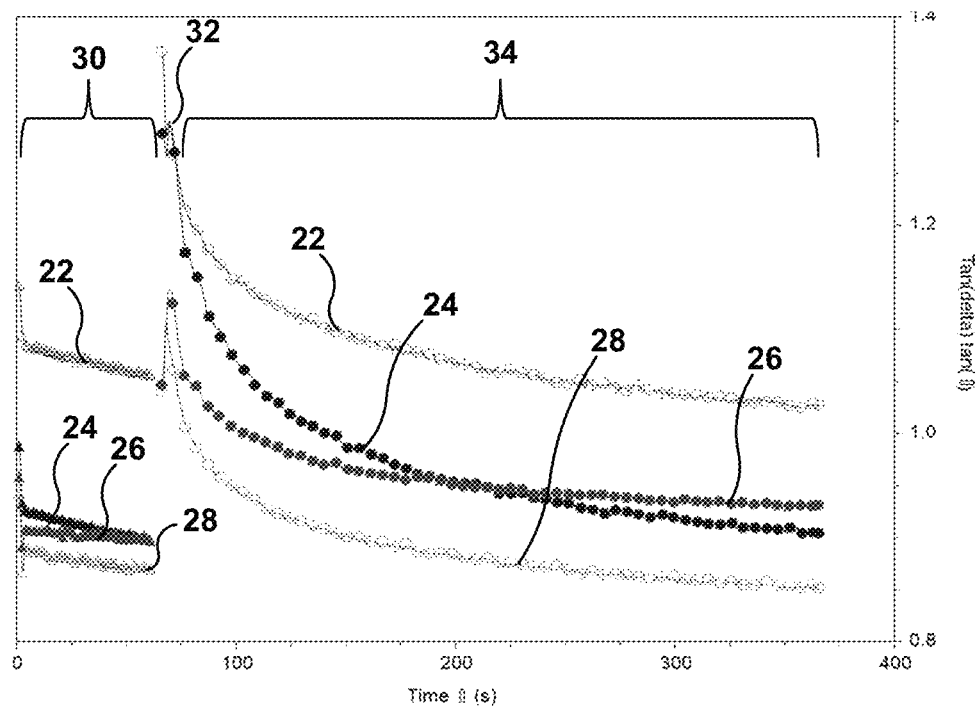
FIG. 2 is a plot of loss tangent (tan(delta)) as a function of time during a 3-interval thixotropy test (3-ITT) for an example aqueous coating composition in accordance with this disclosure and a comparative aqueous coating composition that does not include xanthan gum.

FIG. 2 is a plot of loss tangent (tan(delta)) as a function of time during a 3-interval thixotropy test (3-ITT) on a Discovery HR-3 hybrid rheometer available from TA Instruments for an example aqueous coating composition in accordance with this disclosure and a comparative aqueous coating composition that does not include xanthan gum. A 50 mm diameter Peltier plate was used. The high shear was 85001/s. The example aqueous coating composition and comparative aqueous coating composition were the same as those described with reference to Example 1 (Table 1). Curve 22 represents the response of the comparative aqueous coating composition at 40° F. prior to exposure to high shear (region 30), during high shear (region 32), and after high shear (region 34). Curve 24 represents the response of the example aqueous coating composition in accordance with this disclosure at 40° F. prior to exposure to high shear (region 30), during high shear (region 32), and after high shear (region 34). Curve 26 represents the response of the example aqueous coating composition in accordance with this disclosure at 90° F. prior to exposure to high shear (region 30), during high shear (region 32), and after high shear (region 34). Curve 28 represents the response of the comparative aqueous coating composition at 90° F. prior to exposure to high shear (region 30), during high shear (region 32), and after high shear (region 34). As shown in FIG. 2, the example aqueous coating composition in accordance with this disclosure and comparative aqueous coating composition exhibited less variability in the loss tangent between 40° F. and 90° F. than the comparative aqueous coating composition. Further, the example aqueous coating composition in accordance with this disclosure exhibited a higher loss tangent in region 34 than in region 30 at both 40° F. and 90° F. This suggests that the example aqueous coating composition in accordance with this disclosure exhibits more consistent application, in can, and appearance properties between 40° F. and 90° F. than the comparative aqueous coating composition.

Example 3

Figure 3:
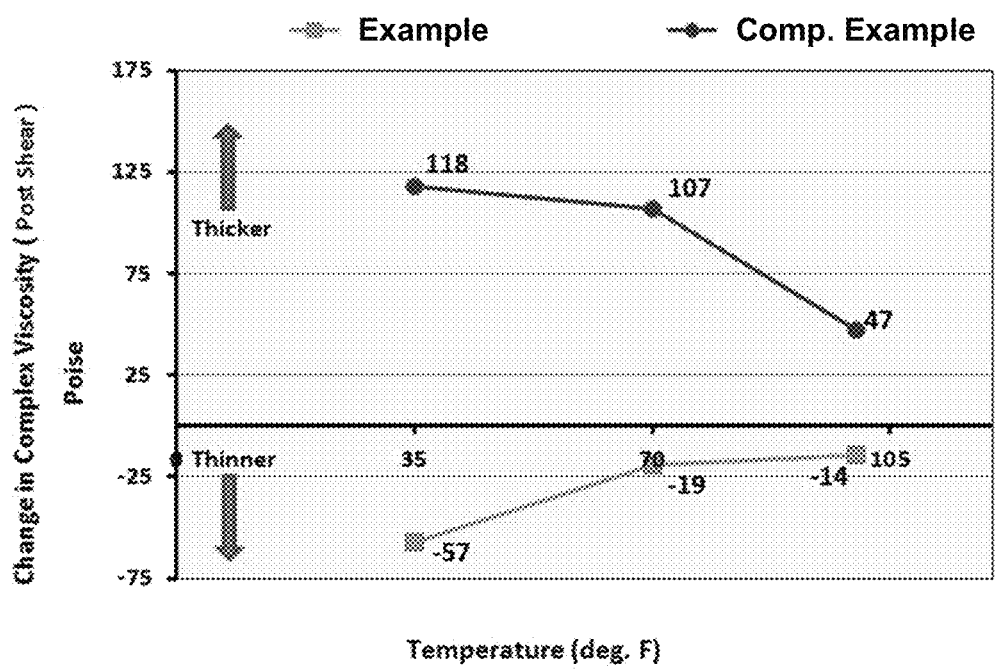
FIGS. 3 and 4 are plots of change in complex viscosity versus temperature and change in loss tangent versus temperature, respectively, for an example aqueous coating composition in accordance with this disclosure and a comparative aqueous coating composition that does not include xanthan gum.
Figure 4:
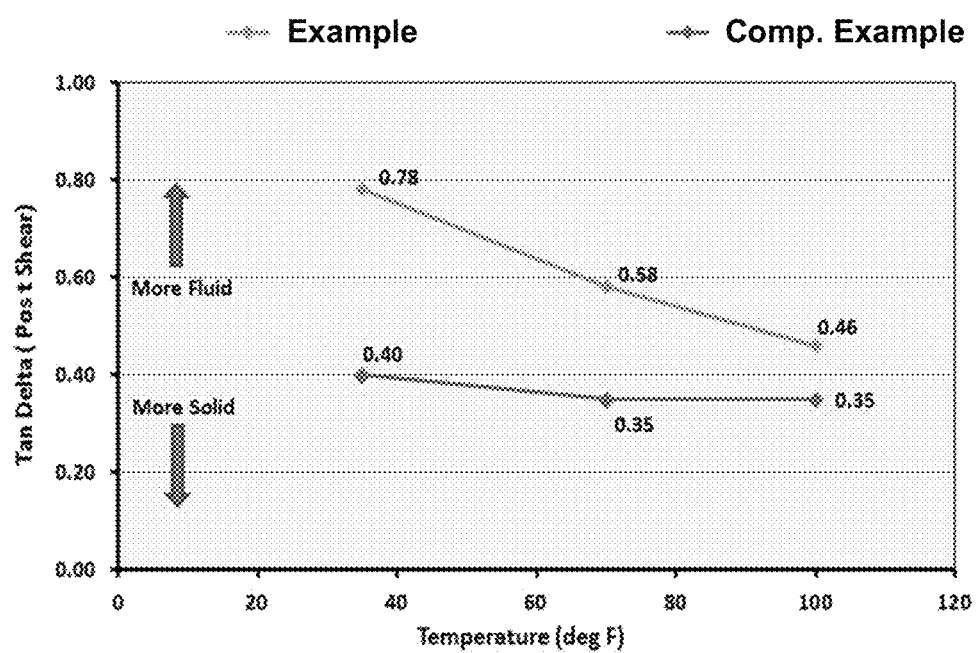

FIGS. 3 and 4 are plots of change in complex viscosity versus temperature and change in loss tangent versus temperature, respectively, for an example aqueous coating composition in accordance with this disclosure and a comparative aqueous coating composition that does not include xanthan gum. The aqueous coating composition in accordance with this disclosure included the composition shown in the left-hand column of Table 2. The comparative aqueous coating composition included the composition shown in the right-hand column of Table 2.

TABLE 2

| Constituent | Sample 2 (wt. %) | Comparative Sample 2 (wt. %) |
|---|---|---|
| Humectant | 0.5944 | 0.589 |
| Photoinitiator | 0.1724 | 0.1708 |
| Surfactant | 0.7825 | 0.9816 |
| Plasticizer | 0.9906 | 0.9816 |
| Co-solvent | 0.3963 | 0.3926 |
| Mildewcide | 2.4529 | 2.401 |
| Defoamer | 0.7925 | 0.8835 |
| Biocide | 0.0994 | 0.4849 |
| HEC rheology agent | 0 | 0.7968 |
| HEUR rheology agent | 2.8233 | 1.3743 |
| Dispersant | 1.0897 | 1.0798 |
| Acrylic latex | 46.5595 | 46.6264 |
| Water | 19.7341 | 20.4046 |
| Buffer | 0.1238 | 0.1227 |
| Extender | 0.1981 | 0.1963 |
| Attapulgite clay | 6.1914 | 6.086 |
| Titania slurry | 16.6425 | 16.491 |
| Xanthan gum | 0.3467 | 0 |

As shown in FIG. 3, the complex viscosity of the example aqueous coating composition in accordance with this disclosure decreased after shear at 35° F., 70° F., and 100° F., while the complex viscosity of the comparative aqueous coating composition increased after shear at the same temperatures. Similarly, FIG. 4 shows that the loss tangent of the example aqueous coating composition in accordance with this disclosure increased after shear at 35° F., 70° F., and 100° F., while the loss tangent of the comparative aqueous coating composition decreased after shear at the same temperatures. These data indicate that the example aqueous coating composition in accordance with this disclosure becomes thinner or more fluid after shear, which improves application (e.g., spray atomization, brush transfer, and brush release) properties and appearance properties (e.g., flow and levelling and brush lines).

Example 4

Figure 5:
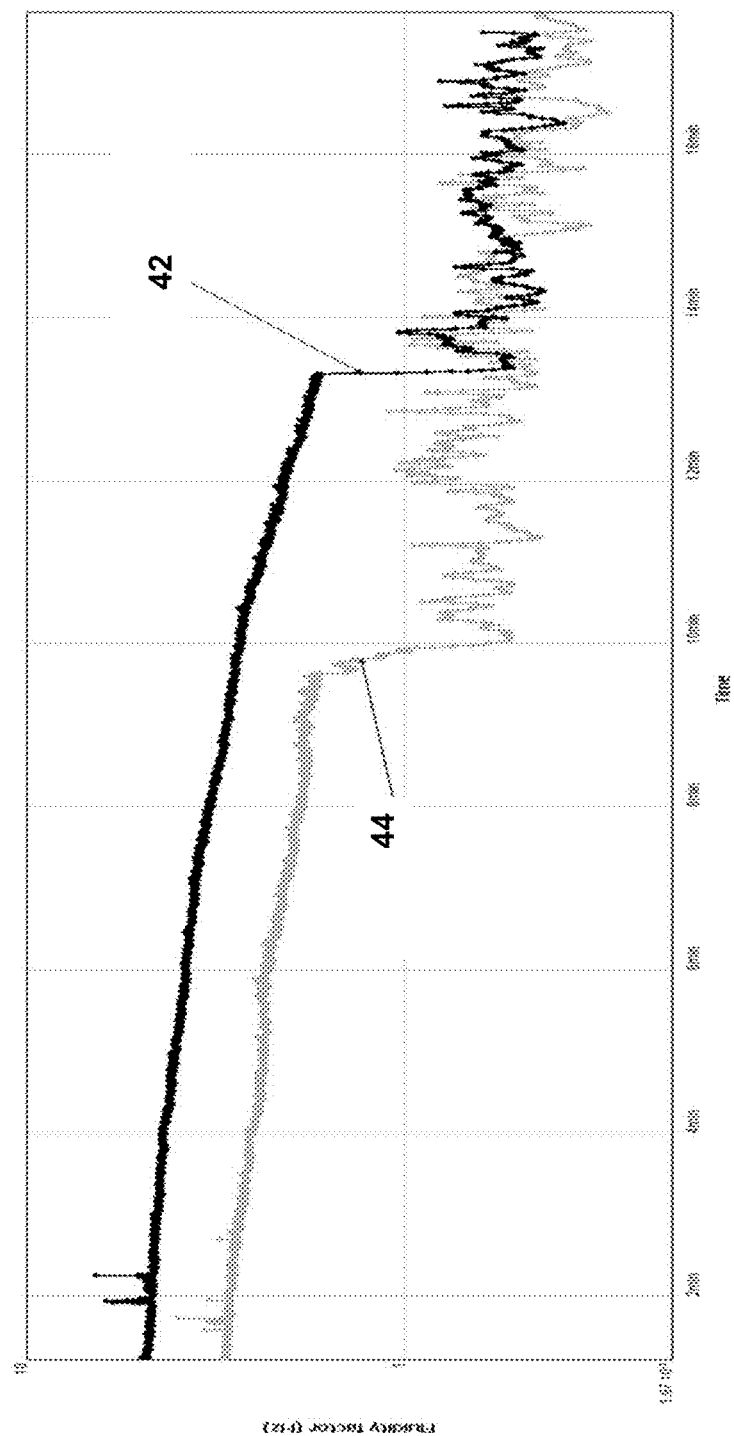
FIG. 5 is a plot of fluidity factor versus time for an example aqueous coating composition in accordance with this disclosure and a comparative aqueous coating composition that does not include xanthan gum.

FIG. 5 is a plot of fluidity factor versus time for an example aqueous coating composition in accordance with this disclosure and a comparative aqueous coating composition that does not include xanthan gum. The example aqueous coating composition and comparative aqueous coating composition were the same as those described with reference to Example 1 (Table 2). FIG. 5 shows that the T1 time of the example aqueous coating composition in accordance with this disclosure 42 was about 41% greater than the T1 time of the comparative aqueous coating composition 44.

Example 5

Figure 6:
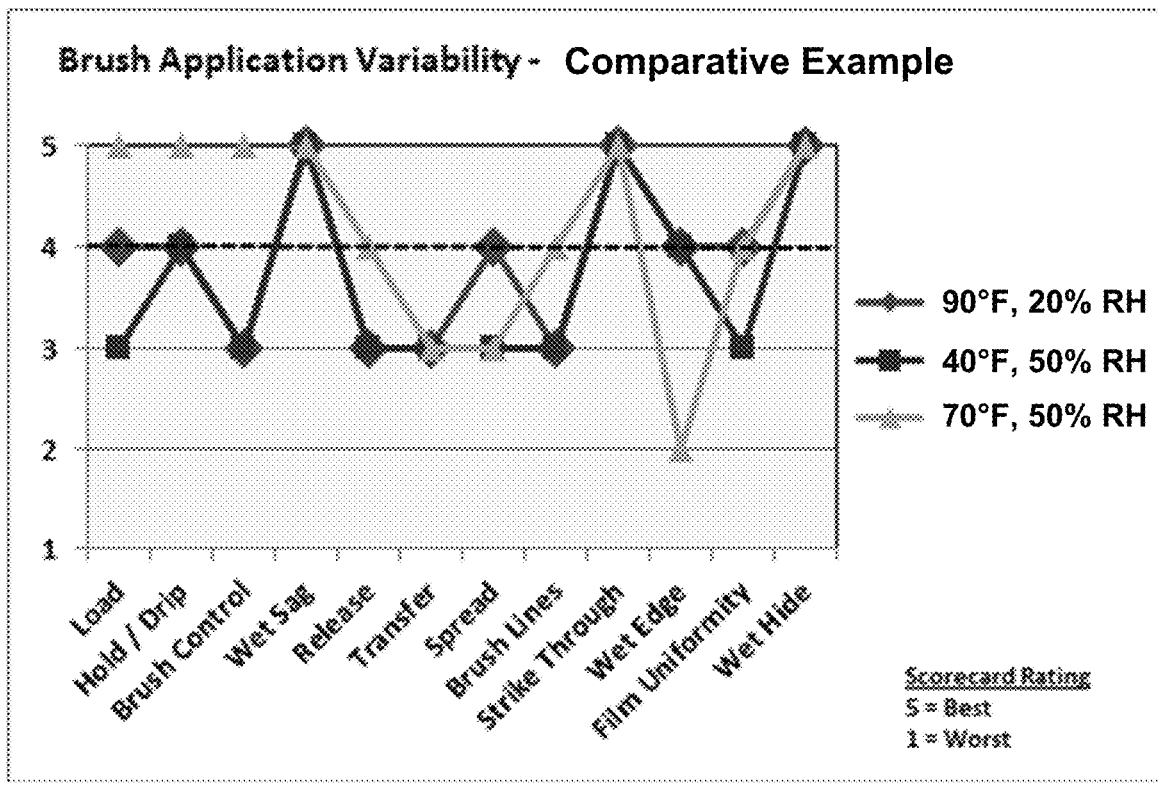
FIGS. 6 and 7 are line diagrams of scores versus category for brush application of a comparative aqueous coating composition that does not include xanthan gum and an example aqueous coating composition in accordance with this disclosure.
Figure 7:
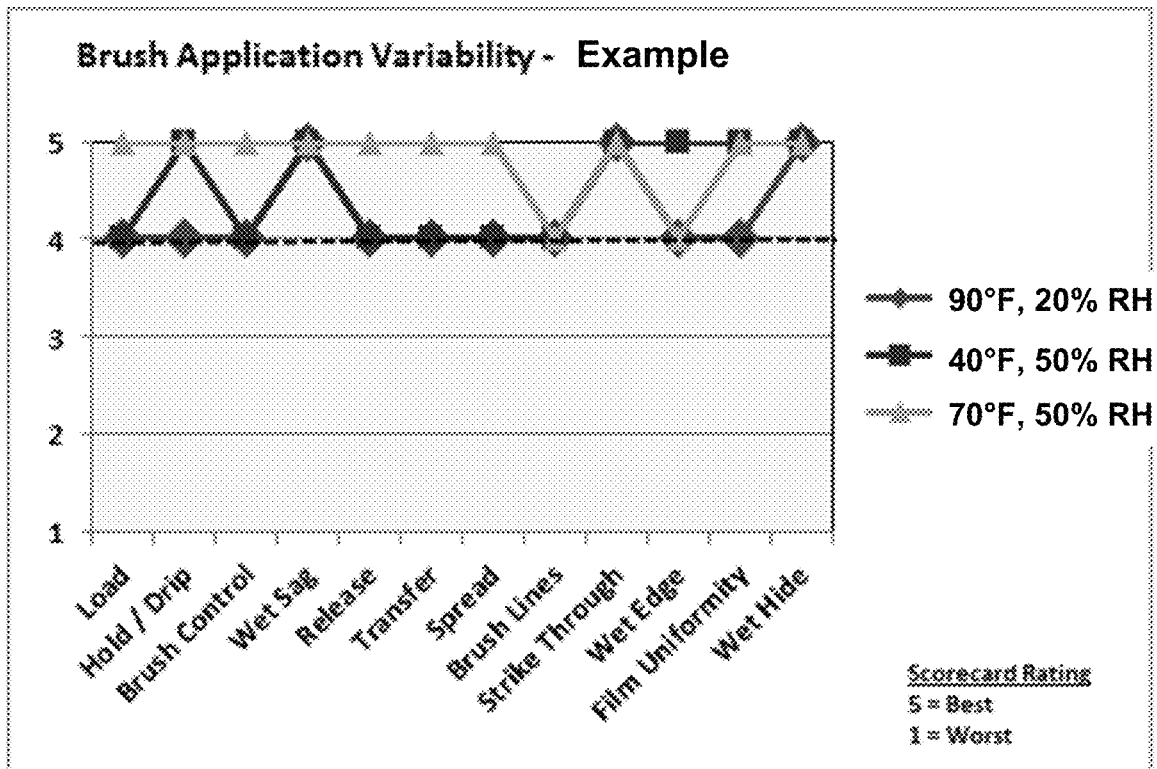

FIGS. 6 and 7 are line diagrams of scores versus category for brush application of a comparative aqueous coating composition that does not include xanthan gum and an example aqueous coating composition in accordance with this disclosure. The example aqueous coating composition and comparative aqueous coating composition were the same as those described with reference to Example 1 (Table 1).

Example 6

Figure 8:
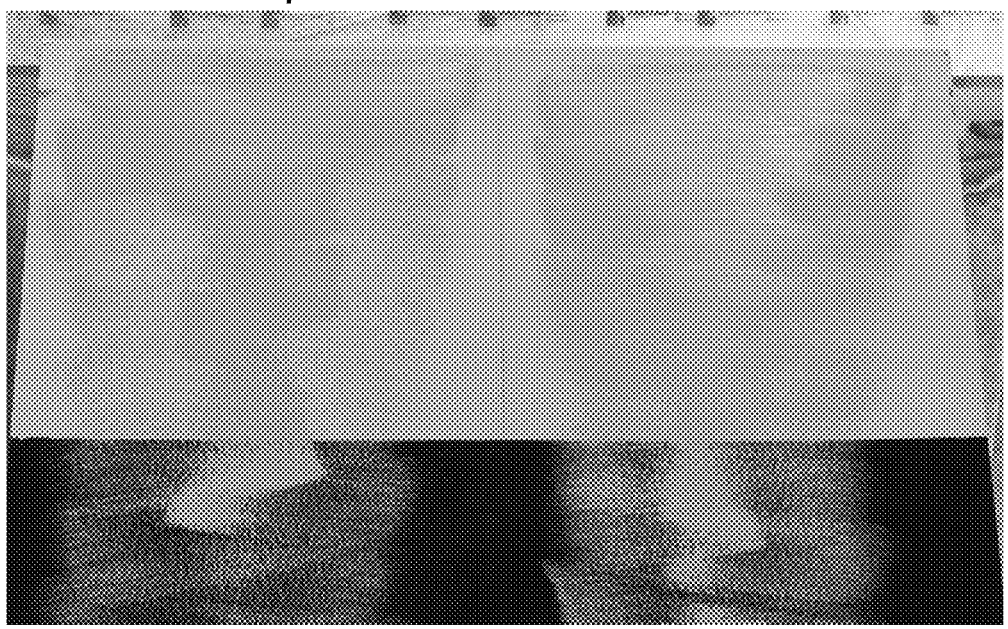
FIG. 8 is a photograph of application of a comparative aqueous coating composition that does not include xanthan gum and an example aqueous coating composition in accordance with this disclosure brushed over a primed drywall at 90° F. and 20% relative humidity.

FIG. 8 is a photograph of application of a comparative aqueous coating composition that does not include xanthan gum and an example aqueous coating composition in accordance with this disclosure brushed over a primed drywall at 90° F. and 20% relative humidity. The example aqueous coating composition and comparative aqueous coating composition were the same as those described with reference to Example 1 (Table 1). As shown in the right-hand portion of FIG. 8 compared to the left-hand portion of FIG. 8, the example aqueous coating composition in accordance with this disclosure provided better coverage and more even film build over the surface.

Example 7

Figure 9:
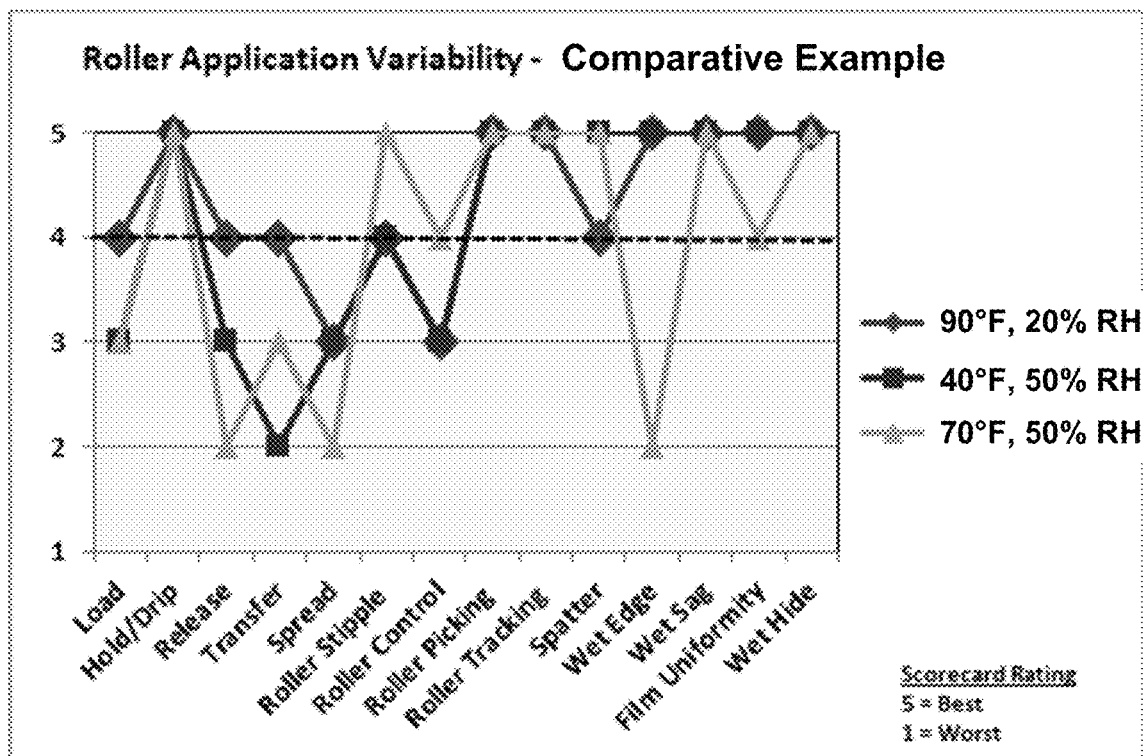
FIGS. 9 and 10 are line diagrams of scores versus category for roller application of a comparative aqueous coating composition that does not include xanthan gum and an example aqueous coating composition in accordance with this disclosure.
Figure 10:
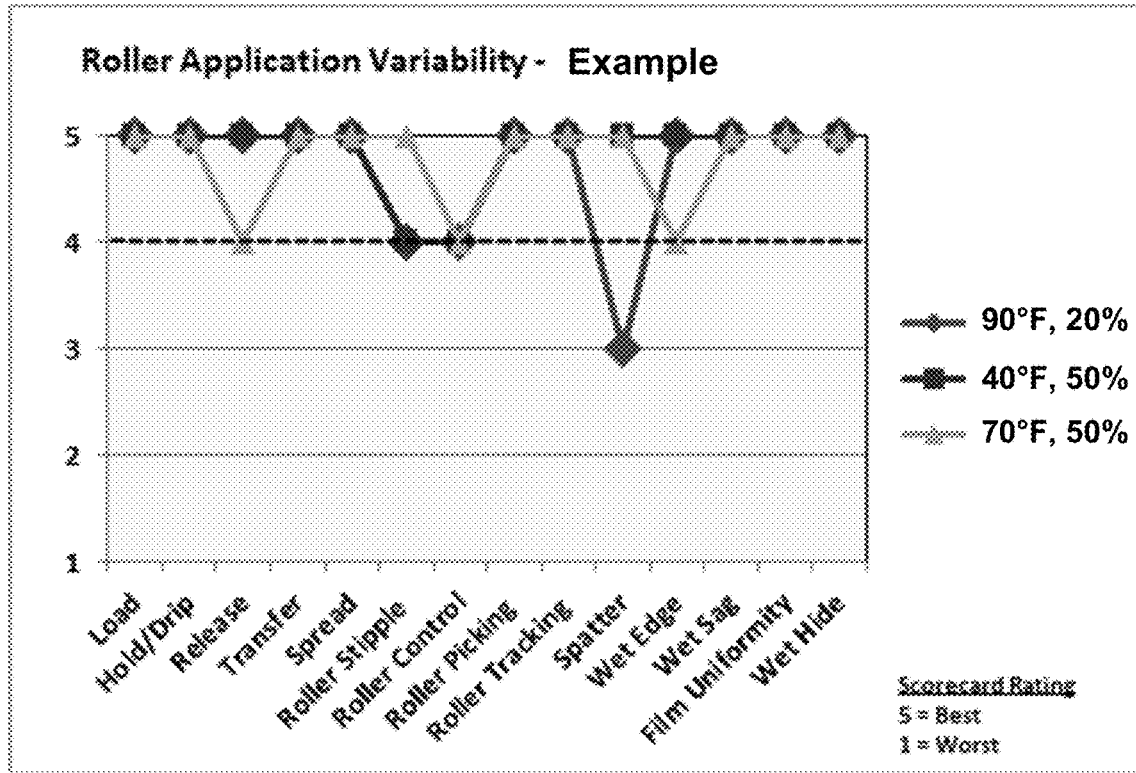

FIGS. 9 and 10 are line diagrams of scores versus category for roller application of a comparative aqueous coating composition that does not include xanthan gum and an example aqueous coating composition in accordance with this disclosure. The example aqueous coating composition and comparative aqueous coating composition were the same as those described with reference to Example 1 (Table 1).

Example 8

Figure 12:
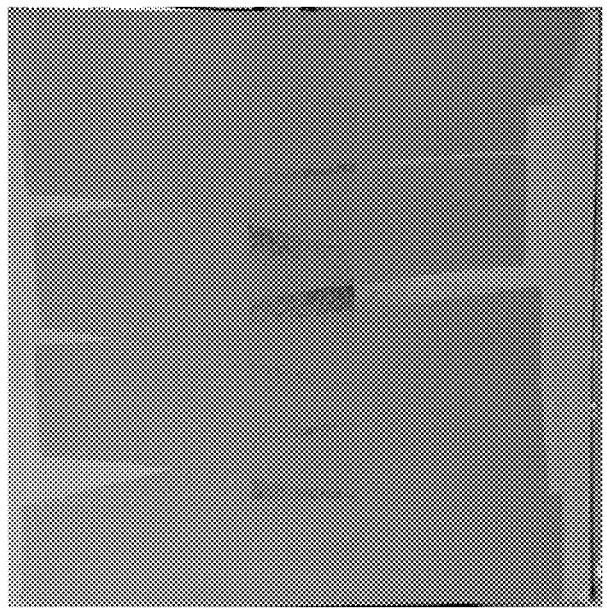
FIGS. 11 and 12 are photographs of application of a comparative aqueous coating composition that does not include xanthan gum and an example aqueous coating composition in accordance with this disclosure, respectively rolled over a primed drywall at 90° F. and 20% relative humidity.
Figure 11:
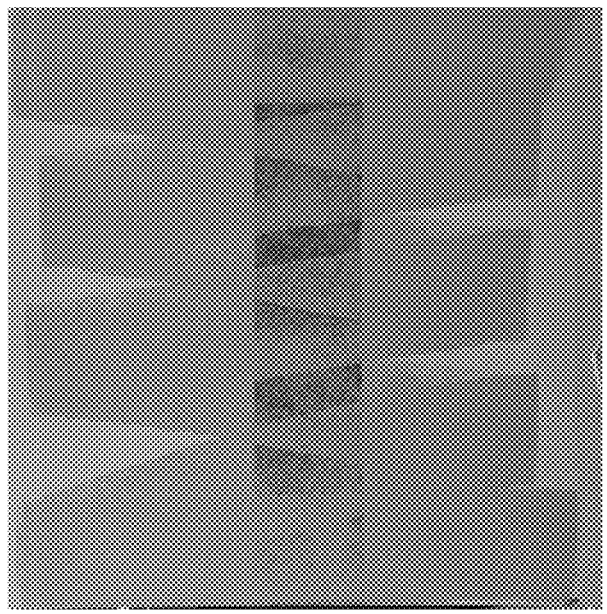

FIGS. 11 and 12 are photographs of application of a comparative aqueous coating composition that does not include xanthan gum and an example aqueous coating composition in accordance with this disclosure, respectively rolled over a primed drywall at 90° F. and 20% relative humidity. The example aqueous coating composition and comparative aqueous coating composition were the same as those described with reference to Example 1 (Table 1). As shown in FIG. 12 compared to FIG. 11, the example aqueous coating composition in accordance with this disclosure provided better coverage and more even film build over the surface.

Example 9

Figure 13:
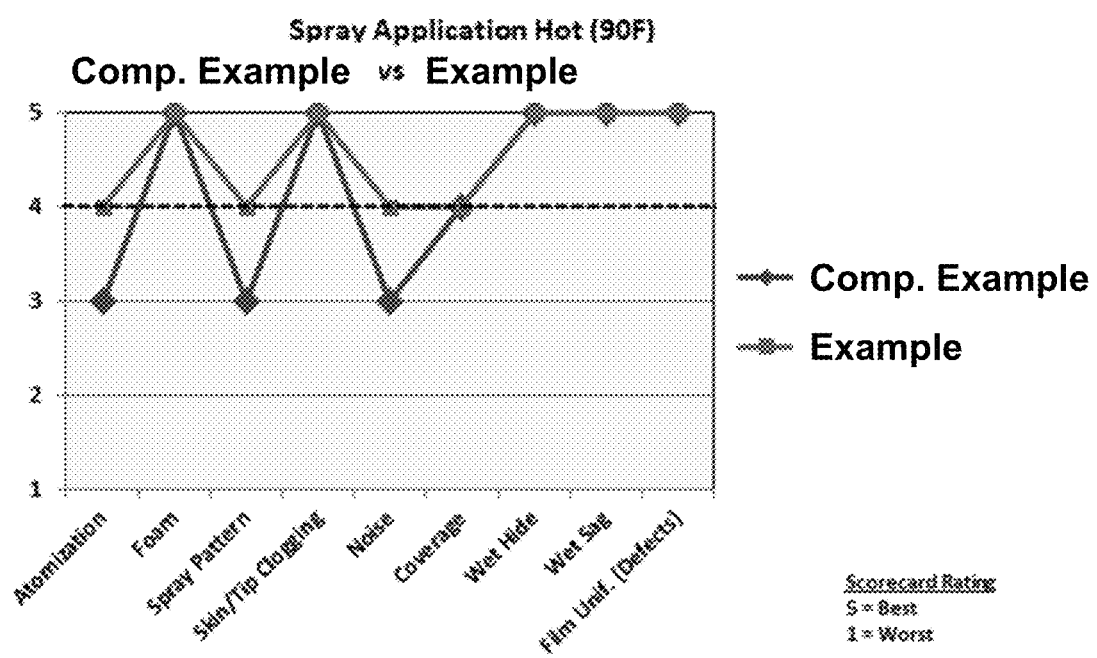
FIG. 13 is a line diagram of scores versus category for spray application of a comparative aqueous coating composition that does not include xanthan gum and an example aqueous coating composition in accordance with this disclosure at 90° F.

FIG. 13 is a line diagram of scores versus category for spray application of a comparative aqueous coating composition that does not include xanthan gum and an example aqueous coating composition in accordance with this disclosure at 90° F. The example aqueous coating composition and comparative aqueous coating composition were the same as those described with reference to Example 1 (Table 1).

Example 10

Figure 14:
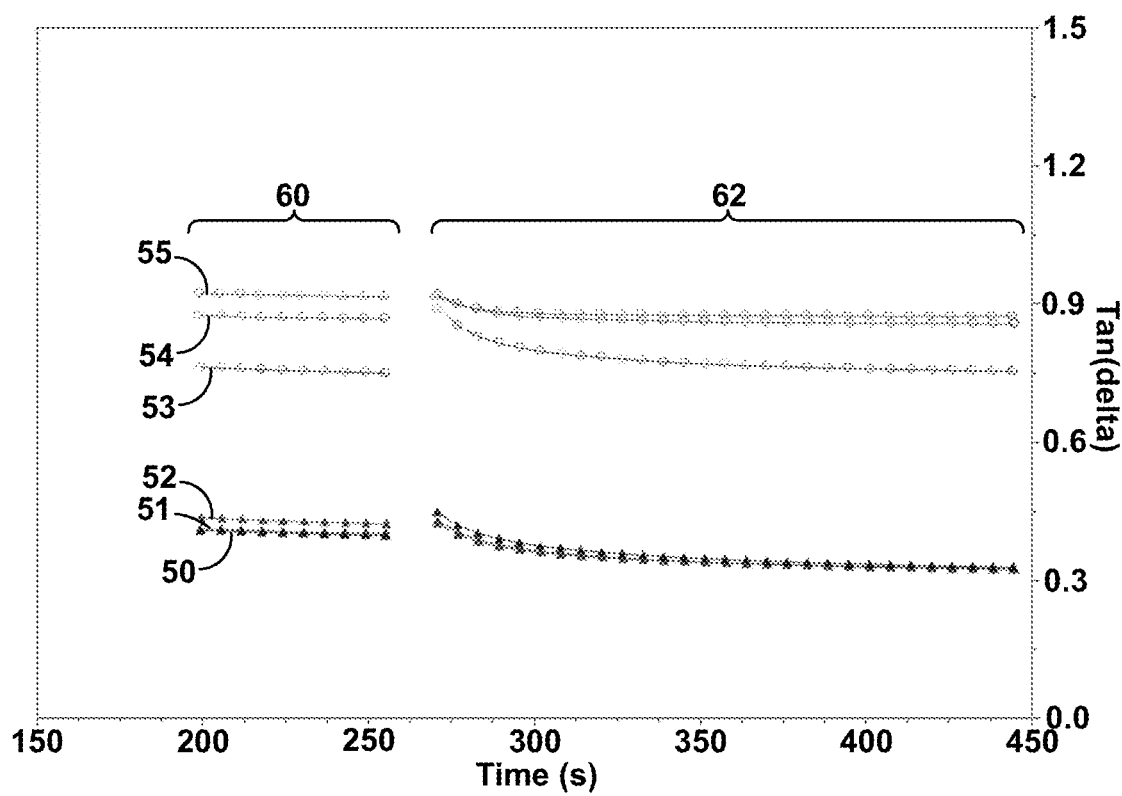
FIG. 14 is a plot of loss tangent (tan(delta)) as a function of time during a 3-interval thixotropy test (3-ITT) on a Discovery HR-3 hybrid rheometer available from TA Instruments for an example aqueous coating composition in accordance with this disclosure and a comparative control aqueous coating composition for wood stains that does not include xanthan gum.

FIG. 14 is a plot of loss tangent (tan(delta)) as a function of time during a 3-interval thixotropy test (3-ITT) on a Discovery HR-3 hybrid rheometer available from TA Instruments for an example aqueous coating composition in accordance with this disclosure and a comparative control aqueous coating composition for wood stains that does not include xanthan gum. The aqueous coating composition in accordance with this disclosure included the composition shown in the left-hand column of Table 3. The comparative aqueous coating composition included the composition shown in the right-hand column of Table 3. A concentric cylinder (Bob diameter: 27.93 mm, Bob length:41.98 mm, and Cup diameter: 30.4 mm) was used. The high shear was 3500/s. Curve 50 represents the response of the comparative control aqueous coating composition at 35° F. prior to exposure to high shear (region 60), and after high shear (region 62). Curve 53 represents the response of the example aqueous coating composition in accordance with this disclosure at 35° F. prior to exposure to high shear (region 60), and after high shear (region 62). Curve 54 represents the response of the example aqueous coating composition in accordance with this disclosure at 70° F. prior to exposure to high shear (region 60), and after high shear (region 62). Curve 51 represents the response of the comparative control aqueous coating composition at 70° F. prior to exposure to high shear (region 60), and after high shear (region 62). Curve 52 represents the response of the comparative control aqueous coating composition at 100° F. prior to exposure to high shear (region 60), and after high shear (region 62). Curve 55 represents the response of the example aqueous coating composition in accordance with this disclosure at 100° F. prior to exposure to high shear (region 60), and after high shear (region 62). As shown in FIG. 14, the example aqueous coating composition in accordance with this disclosure exhibited much higher tan delta values at 35° F., 70° F., and at 100° F. than the comparative control aqueous coating composition. This suggests that the example aqueous coating composition in accordance with this invention exhibits better flow and leveling properties when brush applied between 35° F., 70° F. and at 100° F. than the comparative control aqueous coating composition.

TABLE 3

| Constituent | Sample 3 (wt. %) | Comparative Control 3 (wt. %) |
| --- | --- | --- |
| Humectant | 1.96 | 1.02 |
| Co-solvent | 0.87 | 1.31 |
| Mildewcide | 1.42 | 1.42 |
| Defoamer | 0.66 | 1.09 |
| Biocide | 0.29 | 0.20 |
| Nonionic rheology modifier | 2.29 | 1.16 |
| HEUR rheology agent | 0.78 | — |
| Dispersant | 1.09 | 1.09 |
| Acrylic latex | 47.10 | 47/09 |
| Water | 32.04 | 34.52 |
| Buffer | 0.19 | 0.19 |
| Extender | 10.91 | 10.91 |
| Xanthan gum | 0.40 | 0 |

Example 11

Figure 15:
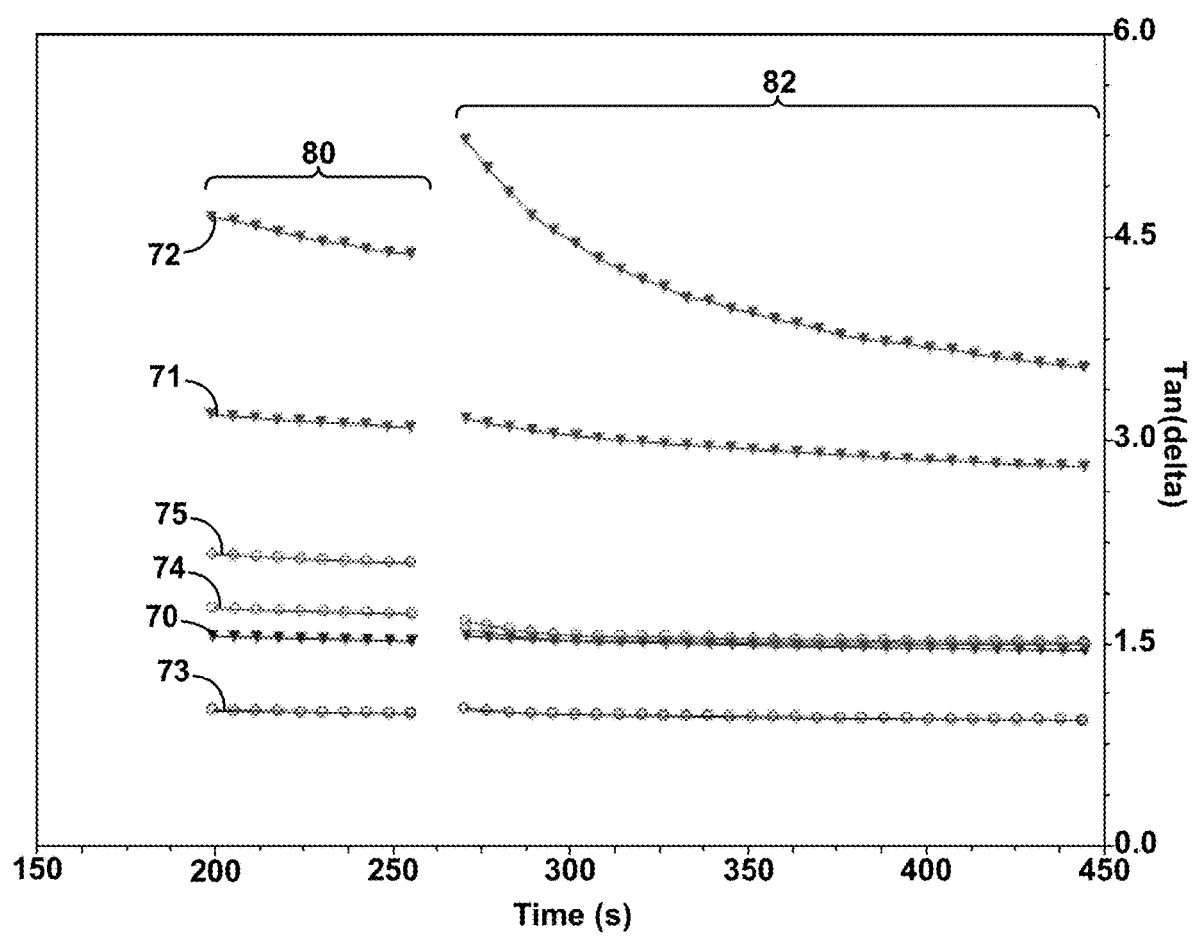
FIG. 15 is a plot of loss tangent (tan(delta)) as a function of time during a 3-interval thixotropy test (3-ITT) on a Discovery HR-3 hybrid rheometer available from TA Instruments for an example aqueous coating composition useful for factory finish wood coatings in accordance with this disclosure and a comparative control aqueous coating composition for factory-finish wood coatings that does not include xanthan gum.

FIG. 15 is a plot of loss tangent (tan(delta)) as a function of time during a 3-interval thixotropy test (3-ITT) on a Discovery HR-3 hybrid rheometer available from TA Instruments for an example aqueous coating composition useful for factory finish wood coatings in accordance with this disclosure and a comparative control aqueous coating composition for factory-finish wood coatings that does not include xanthan gum. The aqueous coating composition in accordance with this disclosure included the composition shown in the left-hand column of Table 4. The comparative aqueous coating composition included the composition shown in the right-hand column of Table 4. A concentric cylinder (Bob diameter: 27.93 mm, Bob length:41.98 mm, and Cup diameter: 30.4 mm) was used. The high shear was 3000/s. Curve 70 represents the response of the comparative control aqueous coating composition at 50° F. prior to exposure to high shear (region 80), and after high shear (region 82). Curve 73 represents the response of the example aqueous coating composition in accordance with this disclosure at 50° F. prior to exposure to high shear (region 80), and after high shear (region 82). Curve 74 represents the response of the example aqueous coating composition in accordance with this disclosure at 70° F. prior to exposure to high shear (region 80), and after high shear (region 82). Curve 71 represents the response of the comparative control aqueous coating composition at 70° F. prior to exposure to high shear (region 80), and after high shear (region 82). Curve 72 represents the response of the comparative control aqueous coating composition at 100° F. prior to exposure to high shear (region 80), and after high shear (region 82). Curve 75 represents the response of the example aqueous coating composition in accordance with this disclosure at 100° F. prior to exposure to high shear (region 80), and after high shear (region 82). As shown in FIG. 15, the example aqueous coating composition in accordance with this disclosure and comparative control aqueous coating composition exhibited much lower tan delta values (less than or equal to 1.5) at 50° F., 70° F. and at 100° F. Tan delta values of the comparative control examples were greater than 2.5, especially at 70° F. and at 100° F., which resulted in coatings having excessive flow, sag, mottling, thereby producing an inconsistent appearance. This suggests that the example aqueous coating composition in accordance with this disclosure exhibits more consistent application and appearance properties between 50° F., 70° F., and 100° F. at tan delta values of less than or equal to 1.5. Color and gloss differences between the control and the example of this disclosure are shown in Table 4 and were measured at 50° F. and at 100° F.

TABLE 4

| Constituent | Sample 4 (wt. %) | Comparative Control 4 (wt. %) |
|---|---|---|
| Surfactant | 1.12 | 0.60 |
| Co-solvent | 3.65 | 3.64 |
| Defoamer | 0.73 | 0.73 |
| Biocide | 0.03 | 0.03 |
| HEC rheology agent |  | 0.08 |
| HEUR rheology agent | 0.42 | 0.36 |
| Dispersant | 1.25 | 1.25 |
| Acrylic latex | 54.10 | 54.0 |
| Water | 22.62 | 23.29 |
| Buffer | 0.03 | 0.03 |
| Titanium dioxide | 14.04 | 14.02 |
| Xanthan gum | 0.25 | 0 |
| Wax additive | 1.24 | 1.24 |
| Siloxane additive | 0.31 | 0.31 |
| Silica matting agent | 0.21 | 0.21 |
| Antisettling agent |  | 0.21 |

TABLE 4

| | Cold (50° F.) and Hot (100° F.) Application | |
|---|---|---|
| | ΔE | ΔGloss (at 60) |
| Comparative Control Example 4 | 2.07 | 5.9 |
| Example 4 | 0.47 | 0.8 |

Various examples have been described. These and other examples are within the scope of the following claims.

What is claimed is:

1. An architectural primer or topcoat aqueous coating composition for a substrate, the architectural primer or topcoat aqueous coating composition comprising:
   an aqueous carrier liquid;
   a polymeric binder comprising at least one of a (meth)acrylic latex, a vinyl acrylic latex, or a styrene acrylic latex;
   xanthan gum in an amount between 0.2 wt. % and 0.4 wt. % of the aqueous coating composition;
   a secondary rheology agent present in an amount of 0.2 wt. % to 2.75 wt %, wherein the aqueous coating composition includes about 0.2 wt. % to about 2.5 wt. % of a first secondary rheology agent and 0.1 wt. % to 1 wt. % of a second secondary rheology agent, wherein the secondary rheology agents include a hydrophobically enhanced urethane and a polyether polyol, and
   wherein the substrate is selected from including brick, concrete, stucco, wood, gypsum, metals, alloys, or combinations thereof.

2. The aqueous coating composition of claim 1, being free of cellulose and cellulose-derived constituents.

3. The aqueous coating composition of claim 2, wherein the aqueous coating composition exhibits a tan(delta) of less than 1.5 in a temperature range of 50° to 100° F. at a shear rate of 3000/second.

4. The aqueous coating composition of claim 1, wherein the hydrophobically enhanced urethane comprises hydrophobically modified ethylene oxide urethane.

5. The aqueous coating composition of claim 1, wherein the xanthan gum comprises food grade xanthan gum.

6. The aqueous coating composition of claim 1, further comprising a defoamer and a surfactant.

7. The aqueous coating composition of claim 6, wherein the defoamer comprises at least one of a mineral oil or a silicone.

8. The aqueous coating composition of claim 6, wherein the surfactant comprises a phosphate ester.

9. The aqueous coating composition of claim 1, wherein the aqueous coating composition exhibits a tan(delta) of less than 1.5 in a temperature range of 50° F. to 100° F. at a shear rate of 3000/second.

10. The aqueous coating composition of claim 1, further comprising an additive, wherein the additive comprises at least one of a pigment, a colorant, a dispersant, a fungicide, an UV stabilizer, a wetting agent, a filler, or a coalescent.

11. The aqueous coating composition of claim 1, comprising less than 25 g/L volatile organic compounds.

12. The aqueous coating composition of claim 11, wherein the aqueous coating composition exhibits a tan(delta) of less than 1.5 in a temperature range of 50° F. to 100° F. at a shear rate of 3000/second.

13. An article comprising:
   a substrate; and
   a coating system on the substrate, wherein the coating system includes at least one layer formed from the aqueous coating composition comprising claim 1,
wherein the substrate is selected from brick, concrete, stucco, wood, gypsum, metals, alloys, or combinations thereof.

14. The article of claim 13, wherein the aqueous coating composition is essentially free of cellulose and cellulose-derived constituents.

15. The article of claim 13, wherein the hydrophobically enhanced urethane comprises hydrophobically modified ethylene oxide urethane.

* * * * *